(12) United States Patent
Chen

(10) Patent No.: US 12,591,979 B2
(45) Date of Patent: Mar. 31, 2026

(54) IMAGE GENERATION METHOD AND DEVICE

(71) Applicant: BEIJING BYTEDANCE NETWORK TECHNOLOGY CO., LTD., Beijing (CN)

(72) Inventor: Qi Chen, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 456 days.

(21) Appl. No.: 17/620,452

(22) PCT Filed: Jun. 17, 2020

(86) PCT No.: PCT/CN2020/096547
§ 371 (c)(1),
(2) Date: Dec. 17, 2021

(87) PCT Pub. No.: WO2020/253716
PCT Pub. Date: Dec. 24, 2020

(65) Prior Publication Data
US 2022/0358662 A1 Nov. 10, 2022

(30) Foreign Application Priority Data
Jun. 18, 2019 (CN) .......................... 201910528723.1

(51) Int. Cl.
*G06T 7/215* (2017.01)
*G06T 7/00* (2017.01)

(52) U.S. Cl.
CPC ............ *G06T 7/215* (2017.01); *G06T 7/0012* (2013.01); *G06T 2207/20081* (2013.01); *G06T 2207/20084* (2013.01); *G06T 2207/30196* (2013.01)

(58) Field of Classification Search
CPC ................... G06T 7/215; G06T 7/0012; G06T 2207/20081; G06T 2207/20084;
(Continued)

(56) References Cited

U.S. PATENT DOCUMENTS

| | | | | | |
|---|---|---|---|---|---|
| 5,930,379 A | * | 7/1999 | Rehg | ....................... | G06T 7/251 |
| | | | | | 345/473 |
| 2014/0307955 A1 | * | 10/2014 | Liu | ........................ | G06V 40/10 |
| | | | | | 382/154 |

(Continued)

FOREIGN PATENT DOCUMENTS

| | | | | | |
|---|---|---|---|---|---|
| CN | 101599177 A | * | 12/2009 | | |
| CN | 108875482 A | * | 11/2018 | ......... | G06F 18/2148 |

(Continued)

OTHER PUBLICATIONS

Human Action Recognition Based on Integrating Body Pose, Part Shape, and Motion, Hany El-Ghaish, Mohamed E. Hussien, Amin Shoukry, Rikio Onai, IEEE Access (vol. 6, 2018, pp. 49040-49055), Pub Jan. 1, 2018 (Year: 2018).*

(Continued)

*Primary Examiner* — Jennifer Mehmood
*Assistant Examiner* — Heath E. Wells

(57) ABSTRACT

Embodiments of the present disclosure disclose an image generation method and device. A specific implementation manner of the method includes: acquiring an image of a target moving object, wherein limb parts of the target moving object are presented in the image; inputting the image to a pre-trained detection model to obtain an output result for indicating position distribution of all limb parts, presented in the image, in a preset limb part set; generating thermodynamic images corresponding to all the limb parts based on the output result; and superimposing the generated thermodynamic images to regional positions, corresponding to all the limb parts, in the image to generate an image (Continued)

superimposed with the thermodynamic images. According to the implementation manner, positioning deviation caused by detecting the limb parts of the moving object in a key point detection manner is avoided, the accuracy of positioning the limb parts is improved, and it is beneficial to accurately guiding a user to complete subsequent limb actions.

17 Claims, 6 Drawing Sheets

(58) Field of Classification Search
CPC . G06T 2207/30196; G06T 2207/10024; G06T 2207/30221; G06T 11/00; G06T 19/006
USPC .......................................................... 382/103
See application file for complete search history.

(56) References Cited

U.S. PATENT DOCUMENTS

| | | | | |
|---|---|---|---|---|
| 2014/0347479 | A1* | 11/2014 | Givon .................. | G06V 40/103 |
| | | | | 382/116 |
| 2017/0168586 | A1* | 6/2017 | Sinha .................... | G06N 20/00 |
| 2020/0090408 | A1* | 3/2020 | Virkar ................. | G06V 10/764 |

FOREIGN PATENT DOCUMENTS

| | | | | | |
|---|---|---|---|---|---|
| CN | 109117753 A | * | 1/2019 | ......... | G06K 9/00362 |
| CN | 109274883 A | * | 1/2019 | ......... | G06K 9/00362 |
| CN | 109658455 A | | 4/2019 | | |
| CN | 109685013 A | | 4/2019 | | |
| CN | 110264539 A | | 9/2019 | | |
| CN | 106056050 B | * | 1/2020 | ......... | G06K 9/00348 |

OTHER PUBLICATIONS

Human pose estimation based on human limbs, Guoqiang Liang, Xuguang La, Jiang Wang, Nanning Zheng , 2016 23rd International Conference on Pattern Recognition (ICPR) (2016, pp. 913-918), 10.1109/ICPR.2016.7899752 pub Dec. 1, 2016 ( Year: 2016).*

International Patent Application No. PCT/CN2020/096547, International Search Report mailed Sep. 22, 2020, 3 pages.

Chinese Patent Application No. 201910528723.1, First Office Action mailed Oct. 28, 2021, 8 pages.

Zewen Z., et al., "From Excel to PowerBI Business Intelligence Data Visualization Analysis and Practice," Jun. 30, 2018, pp. 287-290.

Written Opinion mailed Sep. 22, 2020 in PCT Appl. No. PCT/CN2020/096547, English translation (9 pages).

* cited by examiner

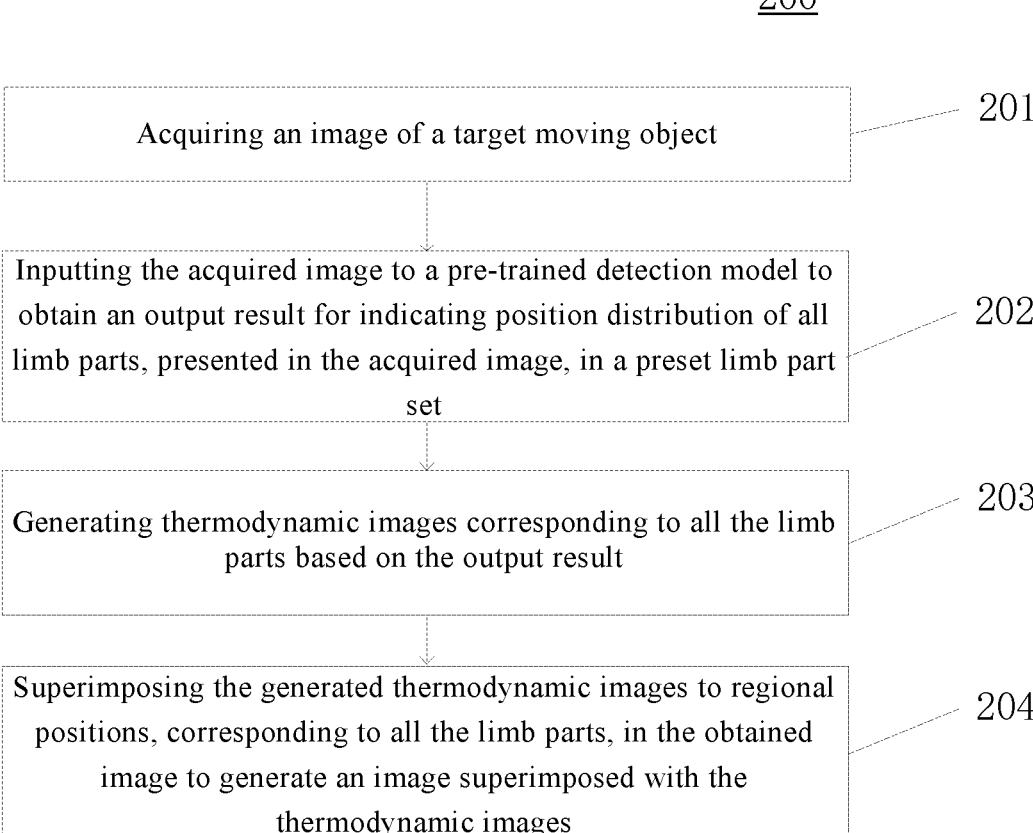

200

Acquiring an image of a target moving object — 201

Inputting the acquired image to a pre-trained detection model to obtain an output result for indicating position distribution of all limb parts, presented in the acquired image, in a preset limb part set — 202

Generating thermodynamic images corresponding to all the limb parts based on the output result — 203

Superimposing the generated thermodynamic images to regional positions, corresponding to all the limb parts, in the obtained image to generate an image superimposed with the thermodynamic images — 204

Fig. 2

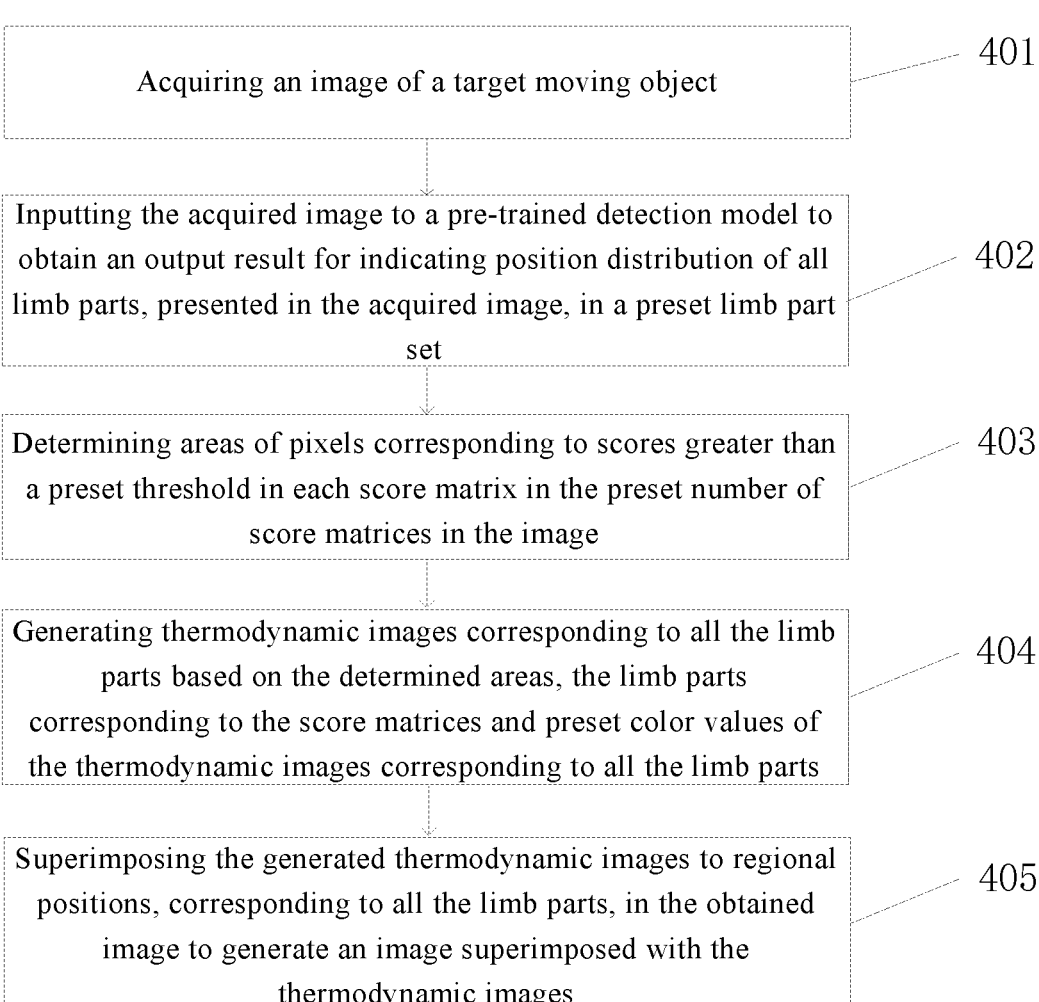

400

Acquiring an image of a target moving object — 401

Inputting the acquired image to a pre-trained detection model to obtain an output result for indicating position distribution of all limb parts, presented in the acquired image, in a preset limb part set — 402

Determining areas of pixels corresponding to scores greater than a preset threshold in each score matrix in the preset number of score matrices in the image — 403

Generating thermodynamic images corresponding to all the limb parts based on the determined areas, the limb parts corresponding to the score matrices and preset color values of the thermodynamic images corresponding to all the limb parts — 404

Superimposing the generated thermodynamic images to regional positions, corresponding to all the limb parts, in the obtained image to generate an image superimposed with the thermodynamic images — 405

Fig. 4

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 4 | 4 | 4 | 4 | 4 | 4 | 0 | 0 | 0 | 0 |
| 0 | 0 | 0 | 0 | 0 | 6 | 6 | 6 | 6 | 6 | 6 | 0 | 0 | 0 | 0 |
| 0 | 0 | 0 | 0 | 0 | 3 | 7 | 9 | 9 | 6 | 1 | 0 | 0 | 0 | 0 |
| 0 | 0 | 0 | 0 | 0 | 3 | 5 | 9 | 9 | 7 | 1 | 0 | 0 | 0 | 0 |
| 0 | 0 | 0 | 0 | 0 | 3 | 6 | 9 | 9 | 1 | 1 | 0 | 0 | 0 | 0 |
| 0 | 0 | 0 | 0 | 0 | 3 | 4 | 6 | 9 | 9 | 1 | 0 | 0 | 0 | 0 |
| 0 | 0 | 0 | 0 | 0 | 5 | 4 | 5 | 9 | 9 | 1 | 0 | 0 | 0 | 0 |
| 0 | 0 | 0 | 0 | 0 | 7 | 9 | 9 | 1 | 1 | 1 | 0 | 0 | 0 | 0 |
| 0 | 0 | 0 | 0 | 0 | 9 | 9 | 9 | 1 | 1 | 1 | 0 | 0 | 0 | 0 |
| 0 | 0 | 0 | 0 | 0 | 9 | 9 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

IMAGE GENERATION METHOD AND DEVICE

CROSS REFERENCE TO RELATED APPLICATIONS

This disclosure is a U.S. National Stage of International Application No. PCT/CN2020/096547, filed on Jun. 17, 2020, which claims the priority benefit of Chinese application Ser. No. 201910528723.1, filed on Jun. 18, 2019, which are incorporated herein by reference in their entireties.

FIELD

Embodiments of the present disclosure relate to the technical field of computers, in particular to, an image generation method and device.

BACKGROUND

With the development of science and technology and the popularization of artificial intelligence technology, a virtual reality technology and an augmented reality technology have been rapidly developed. Existing technologies such as the virtual reality technology and the augmented reality technology are generally combined with a machine learning technology and an image processing technology so that various terminal applications are developed.

In the related art, a captured image of a user is added into a virtual scene to make the user feel immersed in a virtual world, thereby achieving a virtual reality effect. When the virtual reality technology is applied to action applications, since the action that a person waves a limb such as an arm is excessively rapid, it is generally difficult for a camera to capture clear limb parts, and then, it is difficult to accurately guide the user to complete various actions.

SUMMARY

The embodiment of the present disclosure provides an image generation method and device.

In the first aspect, the embodiments of the present disclosure provide an image generation method, including: acquiring an image of a target moving object, wherein limb parts of the target moving object are presented in the image; inputting the image to a pre-trained detection model to obtain an output result for indicating position distribution of all limb parts, presented in the image, in a preset limb part set; generating thermodynamic images corresponding to all the limb parts based on the output result; and superimposing the generated thermodynamic images to regional positions, corresponding to all the limb parts, in the image to generate an image superimposed with the thermodynamic images.

In some embodiments, wherein the output result comprises a preset number of score matrices, each of the score matrices comprises scores which correspond to the image and are used for indicating pixel distribution of the limb parts presented in the image; and the score matrices are in one-to-one correspondence to the limb parts in the limb part set.

In some embodiments, wherein the step of generating thermodynamic images corresponding to all the limb parts based on the output result comprises: determining areas of pixels corresponding to scores greater than a preset threshold in each score matrix in the preset number of score matrices in the image; and generating thermodynamic images corresponding to all the limb parts based on the determined areas, the limb parts corresponding to the score matrices and preset color values of the thermodynamic images corresponding to all the limb parts.

In some embodiments, wherein the detection model is obtained by training according to the following steps: acquiring a training sample set, wherein the training sample set comprises sample images presenting the limb parts and indication information for indicating position distribution, in the sample images, of all the limb parts presented in the sample images; and performing training by using a machine learning method to obtain the detection model based on the training sample set in which the sample images are used as an input and the indication information corresponding to the sample images is used as a desired output.

In some embodiments, wherein the indication information comprises score matrices which correspond to the sample images and are used for indicating pixel distribution of the limb parts presented in the sample images; and The step of performing training by using a machine learning method to obtain the detection model based on the training sample set in which the sample images are used as an input and the indication information corresponding to the sample images is used as a desired output comprises: performing the following training steps: inputting the sample images in the training sample set to a convolutional neural network to obtain sample score matrices for indicating pixel distribution of all the limb parts in the sample images; determining whether differences of the obtained sample score matrices corresponding to all the sample images and the score matrices in the indication information are smaller than a preset threshold; determining that the training for the convolutional neural network is completed in response to a determination that the differences are smaller than the preset threshold, and taking the trained convolutional neural network as the detection model; and adjusting parameters of a to-be-trained convolutional neural network in response to a determination that the differences are greater than or equal to the preset threshold, and re-performing the training steps.

In the second aspect, an embodiment of the present disclosure provides an image generation device, comprising: an acquisition unit, configured to acquire an image of a target moving object, wherein limb parts of the target moving object are presented in the image; an input unit, configured to input the image to a pre-trained detection model to obtain an output result for indicating position distribution of all limb parts, presented in the image, in a preset limb part set; a first generation unit, configured to generate thermodynamic images corresponding to all the limb parts based on the output result; and a second generation unit, configured to superimpose the generated thermodynamic images to regional positions, corresponding to all the limb parts, in the image to generate an image superimposed with the thermodynamic images.

In some embodiments, the output result comprises a preset number of score matrices, each of the score matrices comprises scores which correspond to the image and are used for indicating pixel distribution of the limb parts presented in the image; and the score matrices are in one-to-one correspondence to the limb parts in the limb part set.

In some embodiments, the first generation unit is further configured to: determine areas of pixels corresponding to scores greater than a preset threshold in each score matrix in the preset number of score matrices in the image; and generate thermodynamic images corresponding to all the limb parts based on the determined areas, the limb parts corresponding to the score matrices and preset color values of the thermodynamic images corresponding to all the limb parts.

In some embodiments, the detection model is obtained by training according to the following steps: acquiring a training sample set, wherein the training sample set comprises sample images presenting the limb parts and indication information for indicating position distribution, in the sample images, of all the limb parts presented in the sample images; and performing training by using a machine learning method to obtain the detection model based on the training sample set in which the sample images are used as an input and the indication information corresponding to the sample images is used as a desired output.

In some embodiments, the indication information comprises score matrices which correspond to the sample images and are used for indicating pixel distribution of the limb parts presented in the sample images; and the detection model is further obtained by training according to the following steps: performing the following training steps: inputting the sample images in the training sample set to a convolutional neural network to obtain sample score matrices for indicating pixel distribution of all the limb parts in the sample images; determining whether differences of the obtained sample score matrices corresponding to all the sample images and the score matrices in the indication information are smaller than a preset threshold; determining that the training for the convolutional neural network is completed in response to a determination that the differences are smaller than the preset threshold, and taking the trained convolutional neural network as the detection model; and adjusting parameters of a to-be-trained convolutional neural network in response to a determination that the differences are greater than or equal to the preset threshold, and re-performing the training steps.

In the third aspect, the embodiments of the present disclosure provide an electronic device, comprising one or more processors; and a storage apparatus, storing one or more programs; wherein when being executed by the one or more processors, the one or more programs enable the one or more processors to implement the method of any one of the implementation in the first aspect.

In the fourth aspect, the embodiments of the present disclosure provide a computer-readable medium, storing a computer program, wherein when being executed by a processor, the program implements the method of any one of the implementation in the first aspect.

According to an image generation method and device provided in the embodiments of the present disclosure, an acquired image of a target moving object is detected to determine positions of limb parts of the target moving object in the image, and thermodynamic images of the positions of the limbs are generated to be superimposed to corresponding positions of the limb parts in the above-mentioned image, so that positioning deviation caused by detecting the limb parts of the moving object in a key point detection manner is avoided, the accuracy of positioning the limb parts is improved, and it is beneficial to accurately guiding a user to complete subsequent limb actions.

BRIEF DESCRIPTION OF THE DRAWINGS

By reading detailed descriptions for non-limiting embodiments with reference to the following accompanying drawings, other features, objectives and advantages of the present disclosure will be more apparent:

FIG. 2 is a process diagram of an embodiment of an image generation method according to the present disclosure;

FIG. 4 is a process diagram of another embodiment of the image generation method according to the present disclosure;

FIG. 5 is a schematic diagram of an application scene of a score matrix according to an embodiment of the present disclosure;

DETAILED DESCRIPTION OF THE EMBODIMENTS

Figure 1:
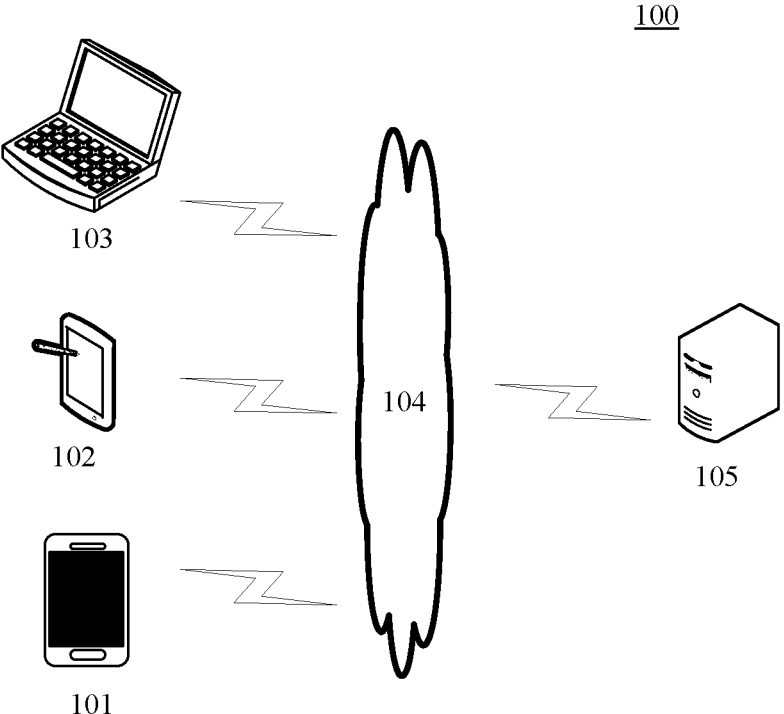
FIG. 1 is a diagram of exemplary system architecture to which an embodiment of the present disclosure can be applied.

The present disclosure will be further described in detail below with reference to the drawings and embodiments. It can be understood that the specific embodiments described here are only used to explain the related invention, but not to limit the invention. In addition, it should be noted that, for ease of description, only the parts related to the relevant invention are shown in the drawings.

It should be noted that the embodiments in the present disclosure and the features in the embodiments can be combined with each other if there is no conflict. Hereinafter, the present disclosure will be described in detail with reference to the drawings and in conjunction with the embodiments.

FIG. 1 shows an exemplary architecture 100 to which an embodiment of the image generation method or image generation device of the present disclosure can be applied.

As shown in FIG. 1, the system architecture 100 may include terminal devices 101, 102, 103, a network 104, and a server 105. The network 104 is used to provide a medium for communication links between the terminal devices 101, 102, 103 and the server 105. The network 104 may include various connection types, such as wired, wireless communication links, or fiber optic cables, and so on.

Various client applications may be installed on the terminal devices 101, 102, 103. For example, image processing applications, augmented reality applications, virtual reality applications, motion guidance applications, sports and fitness applications, etc. You can also install cameras, camera applications, etc. The terminal devices 101, 102, 103 can interact with the server 105 via the network 104 to receive or send messages and so on.

The terminal devices 101, 102, and 103 may be hardware or software. When the terminal devices 101, 102, 103 are hardware, they may be various electronic devices that can receive user operations, including but not limited to smart phones, tablet computers, e-book readers, laptop computers, desktop computers, and so on. When the terminal devices 101, 102, 103 are software, they can be installed in the electronic devices listed above. It can be implemented as multiple software or software modules (for example, multiple software or software modules used to provide distributed services), or as a single software or software module. There is no specific limitation here.

The server 105 may be a background server that supports client applications installed on the terminal devices 101, 102, and 103. The server 105 may perform detection processing on the received image of the target moving object acquired by the terminal, and generate an image including the heat map of each limb part for presentation on the terminal.

It should be noted that the server 105 may be hardware or software. When the server is hardware, it can be implemented as a distributed server cluster composed of multiple servers, or as a single server. When the server is software, it can be implemented as multiple software or software modules (for example, multiple software or software modules used to provide distributed services), or as a single software or software module. There is no specific limitation here.

It should be noted that the image generation method provided by the embodiment of the present disclosure may be executed by the server 105, and may also be executed by the terminal devices 101, 102, and 103. Correspondingly, the image generating device may be set in the server 105, or may be set in the terminal devices 101, 102, 103.

It should be understood that the numbers of terminal devices, networks, and servers in FIG. 1 are merely illustrative. According to implementation needs, there can be any number of terminal devices, networks, and servers. In the case that the data used in the process of generating dynamic images does not need to be obtained remotely, the above system architecture may not include the network, but only include the terminal device or the server.

Further reference is made to FIG. 2 in which a process 200 of an embodiment of an image generation method according to the present disclosure is shown. The image generation method includes the following steps.

Step 201, acquiring an image of a target moving object.

In the present embodiment, an execution subject (such as terminal devices 101, 102 and 103 or a server 105 as shown in FIG. 1) for the above-mentioned image generation method may be provided with a photographing device or connected with the photographing device. The image of the target moving object may be sent to the above-mentioned execution subject after being photographed by the photographing device. Herein, the image of the target moving object may be acquired by the photographing device in real time or acquired based on a preset time interval.

Herein, the above-mentioned target moving object may be a human body. Limb parts of the target moving object may be presented in the acquired image. Herein, the limb parts may include, but are not limited to hands, big arms, forearms, thighs, shanks, the neck, the back, the waist, feet, knees and shoulders.

Step 202, inputting the acquired image to a pre-trained detection model to obtain an output result for indicating position distribution of all limb parts, presented in the acquired image, in a preset limb part set.

In the present embodiment, the above-mentioned preset limb part set may include one limb part or a plurality of limb parts which are set according to demands of scenes. As an example, when the limb parts in the preset limb part set include a left arm and a left leg, the above-mentioned output result is used for indicating position distribution of the left arm and the left leg presented in the acquired image.

In the present embodiment, the above-mentioned output result may include a feature image. Herein, the size of the feature image is the same as that of the acquired image, and image content presented in the feature image includes contours of all the limb parts. Based on the feature image, coordinate positions, in the feature image, of the limb contours presented in the feature image can be determined, then, the coordinate positions are used as image coordinate information of the limb parts in the acquired image. In the present embodiment, in order to make a detection result more accurate and better distinguish all the limb parts, a plurality of feature images may be output, and each of the feature images corresponds to one of the limb parts. For example, when it is required to determine position distribution of a right arm and a right leg in the image, the above-mentioned output result may include two feature images, wherein one of the feature images includes a contour of the right arm, and the other image includes a contour of the left arm.

In the present embodiment, the above-mentioned detection model may be obtained by training based on a training sample by virtue of an existing network structure. The network structure, for example, may include a generative adversarial network, a convolutional neural network and the like. The above-mentioned training sample includes a sample moving image and a desired feature image corresponding to the sample moving image.

As an example, the above-mentioned detection model may be obtained by training the generative adversarial network. Specifically, the generative adversarial network includes a generation network and a discrimination network, wherein the generation network is used for obtaining the feature image after extracting features of a sample image; and the discrimination network is used for determining an error between the obtained feature image and the desired feature image.

The generation network may be a convolutional neural network (such as a convolutional neural network with various structures including a convolution layer, a pooling layer, a de-pooling layer and a de-convolution layer) for image processing. The above-mentioned discrimination network may also be a convolutional neural network (such as a convolutional neural network with various structures including a full-connection layer, wherein the above-mentioned full-connection layer is capable of achieving a classification function).

Herein, the generation network may be repeatedly and iteratively adjusted based on the above-mentioned error output by the discrimination network until the above-mentioned error output by the discrimination network is smaller than a preset value. At the moment, the trained generation network is used as the above-mentioned detection model.

Step 203, generating thermodynamic images corresponding to all the limb parts based on the output result.

In the present embodiment, the above-mentioned execution subject can generate the thermodynamic images corresponding to all the limb parts according to the output result obtained in the step 202. Herein, the thermodynamic images are images presenting the contours of the above-mentioned limb parts in a special highlighting manner. Specifically, the above-mentioned execution subject can determine the coordinate positions of the limb contours presented in the feature image based on the feature image obtained in the step 202, and areas corresponding to the coordinate positions are displayed in a special highlighting manner, so that the thermodynamic images are obtained.

Step 204, superimposing the generated thermodynamic images to regional positions, corresponding to all the limb parts, in the obtained image to generate an image superimposed with the thermodynamic images.

In the present embodiment, the above-mentioned execution subject can superimpose the thermodynamic images generated in the step 203 to the regional positions, corresponding to all the limb parts, in the image acquired in the step 201. As an example, when the above-mentioned limb parts are the left arm and the left leg, the generated thermodynamic images of the left arm and the left leg may be superimposed into the image acquired in the step 201, so that an image superimposed with the thermodynamic images is obtained, and the image is presented on a terminal.

Seen from the embodiment as shown in FIG. 2, by using the image generation method shown in this application, positional areas of all the limb parts presented in the image can be determined by detecting the image of the target moving object. In some application scenes such as a physical exercise application, when a user needs to correct and detect his/her action by virtue of the application, generally, an electronic device on which the application runs can photograph an image of the user, and then, limb actions presented in the photographed image are compared with actions in a preset action library. When the moving speed of the user is overhigh, it is generally impossible to accurately capture all the limb actions of the body. By superimposing the thermodynamic images corresponding to the limb parts to the positions of the limb parts presented in the acquired image, comparison with the actions in the action library can be performed based on the presented thermodynamic images of all the limb parts, which is beneficial to guiding the user to complete subsequent actions, thereby improving the experience of the user.

Figure 3:
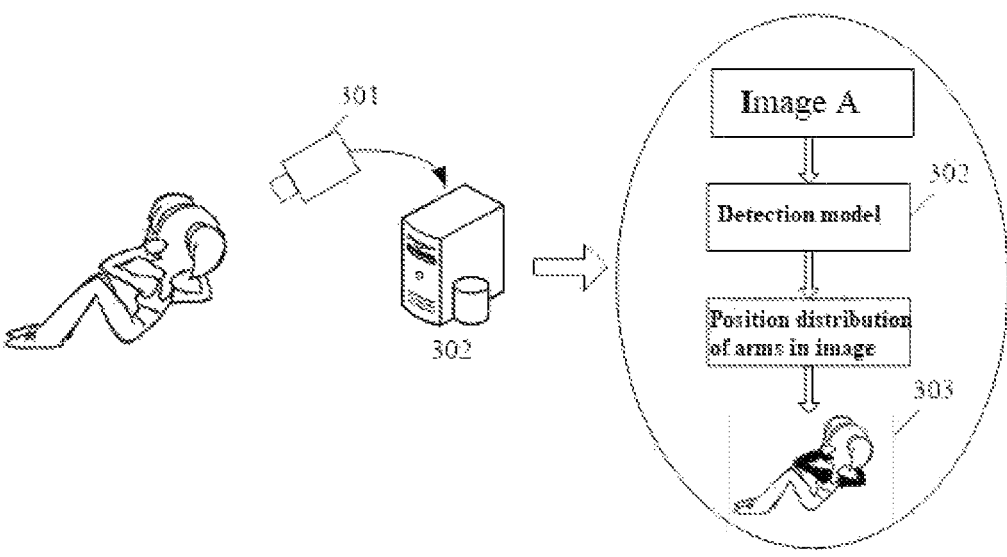
FIG. 3 is a schematic diagram of an application scene of an image generation method according to an embodiment of the present disclosure.

Further reference is made to FIG. 3 in which a diagram of an application scene of an image generation method according to the present disclosure is shown.

In the application scene as shown in FIG. 3, a photographing device 301 sends an image of a user A to an electronic device 302 after acquiring the image. The electronic device 302 may be a terminal such as a mobile phone or a server. Then, the electronic device 302 inputs the acquired image to a detection model 303 to obtain position distribution of arms in the image. Next, thermodynamic images of the arms are generated. Finally, the generated thermodynamic images are superimposed to the positions of the arms in the acquired image to obtain an image 303 superimposed with the thermodynamic images.

Further reference is made to FIG. 4 in which a process 400 of another embodiment of the image generation method according to the present disclosure is shown. The image generation method includes the following steps.

Step 401, acquiring an image of a target moving object.

In the present embodiment, an execution subject (such as terminal devices 101, 102 and 103 or a server 105 as shown in FIG. 1) for the above-mentioned image generation method may be provided with a photographing device or connected with the photographing device. The image of the target moving object may be sent to the above-mentioned execution subject after being photographed by the photographing device. Herein, the image of the target moving object may be acquired by the photographing device in real time or acquired based on a preset time interval.

Herein, the above-mentioned target moving object may be a human body. Limb parts of the target moving object may be presented in the acquired image.

Step 402, inputting the acquired image to a pre-trained detection model to obtain an output result for indicating position distribution of all limb parts, presented in the acquired image, in a preset limb part set.

In the present embodiment, the output result may be a score matrix, and the score matrix is in one-to-one correspondence to all pixels in the acquired image. The image is composed of the pixels, and each of the pixels has its coordinate position in the image. For example, an image of which the resolution is 1024*540 is composed of 1024 pixels in the horizontal direction and 540 pixels in the longitudinal direction. Each of the pixels is composed of color values of three colors including RGB. The first pixel in the first row is the coordinate position of the pixel in the image. That is, each pixel in the image includes a pixel value and a coordinate position located in the image. Each score in the above-mentioned score matrix is used for indicating a probability value that each pixel in the acquired image presents the limb parts. Therefore, the above-mentioned position distribution shows which pixels in the acquired image are used for presenting the limb parts in the preset limb part set. As shown in FIG. 5, a schematic diagram of an application scene of a score matrix provided by the present disclosure is schematically shown. Herein, the output result shown in FIG. 3 is a 15*15 score matrix, that is, the pixel of the obtained image is 15*15. Coordinate positions of all scores in the score matrix are in one-to-one correspondence to the coordinate positions of the pixels in the image. The scores in the score matrix include 0 to 9. It is assumed that the score matrix is used for indicating distribution of the left arm in the acquired image. When a preset score threshold is 8, the position distribution of the left arm in the acquired image is presented by the coordinate positions of the pixels, corresponding to the scores greater than or equal to 8 in the score matrix, in the image.

In the present embodiment, the above-mentioned output result may include a preset number of score matrices, each of the score matrices includes scores which correspond to the acquired image and are used for indicating pixel distribution of the limb parts presented in the acquired image; and the score matrices are in one-to-one correspondence to the limb parts in the limb part set. That is, one of the score matrices is used for indicating the position distribution of one of the limb parts in the above-mentioned limb part set in the acquired image. Therefore, the scores for presenting the pixel distribution of one limb part can be obtained in one score matrix, so that the determined limb parts are more accurate.

In the present embodiment, the above-mentioned detection model may be obtained by training based on training samples. Specifically, a training sample set is acquired, wherein the training sample set includes sample images presenting the limb parts and indication information for indicating position distribution, in the sample images, of all the limb parts presented in the sample images; and based on the training sample set in which the sample images are used as an input and the indication information corresponding to the sample images is used as a desired output, training is performed by using a machine learning method to obtain the detection model.

Herein, the above-mentioned indication information includes score matrices which correspond to the sample images and are used for indicating pixel distribution of the limb parts presented in the sample images. Moreover, the step that based on the training sample set in which the sample images are used as the input and the indication information corresponding to the sample images is used as the desired output, training is performed by using the machine learning method to obtain the detection model may specifically include:

for the sample images in the training sample set, the sample images are input to a convolutional neural network to obtain sample score matrices for indicating pixel distribution of all the limb parts in the sample images; it is determined whether differences of the obtained sample score matrices corresponding to all the sample images and the score matrices in the indication information are smaller than a preset threshold; in response to a determination that the differences are smaller than the preset threshold, it is determined that the training for the convolutional neural network is completed, and the trained convolutional neural network is taken as the detection model; and in response to a determination that the differences are greater than or equal to the preset threshold, parameters of a to-be-trained convolutional neural network are adjusted, and the training steps are re-performed.

Specifically, the above-mentioned detection model may be obtained by training the convolutional neural network. The above-mentioned indication information is the score matrices corresponding to the pixels of the sample images, wherein the scores of the pixels corresponding to the images presenting the limb parts in the score matrices are set as 10, and the remaining scores are set as 0. For example, when it is required to detect position distribution of the left arm and the left leg presented in the sample images, corresponding coordinate positions in the score matrices corresponding to the pixels presenting the left arm and the left leg may be set as 10, and the remaining scores may be set as 0. Then, for all the samples in the training sample set, the samples may be input to a to-be-trained convolutional neural network to obtain sample score matrices for indicating pixels corresponding to the images presenting the limb parts. The obtained sample score matrices are compared with the score matrices in the preset indication information to determine differences of the obtained sample score matrices and the score matrices in the indication information. The differences include differences among all the scores of all the coordinate positions in the score matrices. In response to a determination that the differences are smaller than a preset threshold, it can be determined that the training for the convolutional neural network is completed, and then, the trained convolutional neural network is taken as the detection model. Herein, the above-mentioned determination that the differences are smaller than the preset threshold may include: the number of the scores which are located on the coordinate positions corresponding to the score matrices in the preset indication information in the acquired sample score matrices and of which the differences are smaller than the preset threshold is greater than a preset number value.

In response to a determination that the above-mentioned differences are greater than or equal to the preset threshold, parameters of the convolutional neural network can be adjusted, for example, the number of convolution layers and the size of a convolution kernel in the convolutional neural network can be adjusted. Then, the convolutional neural network of which the parameters are adjusted is further trained by virtue of the above-mentioned training samples until the above-mentioned error is smaller than the preset threshold.

Step 403, determining areas of pixels corresponding to scores greater than a preset threshold in each score matrix in the preset number of score matrices in the image.

In the present embodiment, the above-mentioned execution subject determines the scores greater than the preset threshold in each of the score matrices according to the score matrices determined in the step 402. The positions of pixels in the image are in one-to-one correspondence to the coordinate positions of all the scores in the score matrix, and therefore, distribution areas of the pixels corresponding to the scores greater than the preset threshold in the image can be determined by determining the coordinate positions of the scores greater than the preset threshold in the score matrix.

Step 404, generating the thermodynamic images corresponding to all the limb parts based on the determined areas, the limb parts corresponding to the score matrices and preset color values of the thermodynamic images corresponding to all the limb parts.

In the present embodiment, the color values of the thermodynamic images corresponding to all the limb parts may be preset in the above-mentioned execution subject. For example, a color value of a thermodynamic image for indicating arms may be yellow, a color value of a thermodynamic image for indicating legs may be blue, and a color value of a thermodynamic image for indicating shoulders may be red.

The thermodynamic images corresponding to all the limb parts can be generated according to the limb parts corresponding to all the score matrices, the areas determined in step 403 and the above-mentioned preset color values of the thermodynamic images corresponding to all the limb parts. Herein, the thermodynamic images are images presenting the contours of the above-mentioned limb parts in a special highlighting manner.

Specifically, when there is one above-mentioned score matrix, pixel areas corresponding to the scores greater than the preset threshold in the score matrix may be set to have a highlighted color. However, when there are a plurality of, for example, two above-mentioned score matrices, since each of the score matrices indicates position distribution of one limb part, for each score matrix, the pixel areas corresponding to the scores greater than the preset threshold in the score matrix are set to have a highlighted color. The specific color setting is determined by the above-mentioned preset color values of the thermodynamic images corresponding to all the limb parts. Therefore, a plurality of thermodynamic images can be formed, and each of the thermodynamic images corresponds to one of the limb parts; or one thermodynamic image can be formed, that is, the thermodynamic images of the plurality of limb parts are displayed in the same image based on colors and position distribution.

Step 405, superimposing the generated thermodynamic images to regional positions, corresponding to all the limb parts, in the obtained image to generate an image superimposed with the thermodynamic images.

In the present embodiment, the above-mentioned execution subject can superimpose the thermodynamic images generated in the step 404 to the regional positions, corresponding to all the limb parts, in the image acquired in the step 401. As an example, when the above-mentioned limb parts are the left arm and the left leg, the generated thermodynamic images of the left arm and the left leg can be superimposed into the image acquired in the step 401, so that an image superimposed with the thermodynamic images is obtained, and the image is presented on a terminal.

Seen from FIG. 4, different from the embodiment as shown in FIG. 2, the present embodiment highlights the step that the output result of the detection model is the score matrices and each of the score matrices is used for indicating the position distribution of one of the limb parts. Therefore, due to the adoption of the manner of determining the position distribution of the limb parts by positioning pixel values, a result for the position distribution of the detected limb parts may be more accurate.

Figure 6:
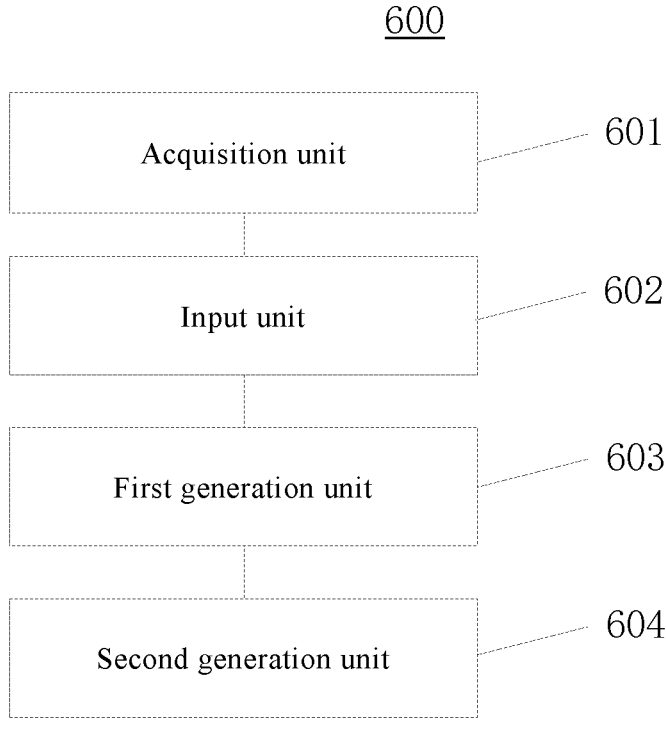
FIG. 6 is a structural schematic diagram of an embodiment of an image generation device according to the present disclosure.

Further reference is made to FIG. 6, as an implementation for the method as shown in each of the above-mentioned diagrams, the present disclosure provides an embodiment of an image generation device, the device embodiment corresponds to the method embodiment as shown in FIG. 2, and the device may be specifically applied to various electronic devices.

As shown in FIG. 6, the image generation device 600 provided in the present embodiment includes an acquisition unit 601, an input unit 602, a first generation unit 603 and a second generation unit 604. The acquisition unit 601 is configured to acquire an image of a target moving object, wherein limb parts of the target moving object are presented in the image; the input unit 602 is configured to input the image to a pre-trained detection model to obtain an output result for indicating position distribution of all limb parts, presented in the image, in a preset limb part set; the first generation unit 603 is configured to generate thermodynamic images corresponding to all the limb parts based on the output result; and the second generation unit 604 is configured to superimpose the generated thermodynamic images to regional positions, corresponding to all the limb parts, in the image to generate an image superimposed with the thermodynamic images.

In the present embodiment, specific processing of the acquisition unit 601, the input unit 602, the first generation unit 603 and the second generation unit 604 in the image generation device 600 and technical effects brought by them may respectively refer to related descriptions in the steps 201, 202, 203 and 204 in the embodiment corresponding to FIG. 2, the descriptions thereof are omitted herein.

In some optional implementation manners of the present embodiment, the output result includes a preset number of score matrices, each of the score matrices includes scores which correspond to the image and are used for indicating pixel distribution of the limb parts presented in the image; and the score matrices are in one-to-one correspondence to the limb parts in the limb part set.

In some optional implementation manners of the present embodiment, the first generation unit 603 is further configured to: determine areas of pixels corresponding to scores greater than a preset threshold in each score matrix in the preset number of score matrices in the image; and generate the thermodynamic images corresponding to all the limb parts based on the determined areas, the limb parts corresponding to the score matrices and preset color values of the thermodynamic images corresponding to all the limb parts.

In some optional implementation manners of the present embodiment, the detection model is obtained by training according to the following steps: acquiring a training sample set, wherein the training sample set includes sample images presenting the limb parts and indication information for indicating position distribution, in the sample images, of all the limb parts presented in the sample images; and performing training by using a machine learning method to obtain the detection model based on the training sample set in which the sample images are used as an input and the indication information corresponding to the sample images is used as a desired output.

In some optional implementation manners of the present embodiment, the indication information includes score matrices which correspond to the sample images and are used for indicating pixel distribution of the limb parts presented in the sample images; and the detection model is further obtained by training according to the following steps: performing the following training steps: inputting sample images in the training sample set to a convolutional neural network to obtain sample score matrices for indicating pixel distribution of all the limb parts in the sample images; determining whether differences of the obtained sample score matrices corresponding to all the sample images and the score matrices in the indication information are smaller than a preset threshold; in response to a determination that the differences are smaller than the preset threshold, determining that the training for the convolutional neural network is completed, and taking the trained convolutional neural network as the detection model; and in response to a determination that the differences are greater than or equal to the preset threshold, adjusting parameters of a to-be-trained convolutional neural network, and re-performing the training steps.

According to the image generation device provided in the embodiments of the present disclosure, the acquired image of the target moving object is detected to determine the positions of the limb parts of the target moving object in the image, and the thermodynamic images of the positions of the limbs are generated to be superimposed to the corresponding positions of the limb parts in the above-mentioned image, so that positioning deviation caused by detecting the limb parts of the moving object in a key point detection manner is avoided, the accuracy of positioning the limb parts is improved, and it is beneficial to accurately guiding a user to complete subsequent limb actions.

Figure 7:
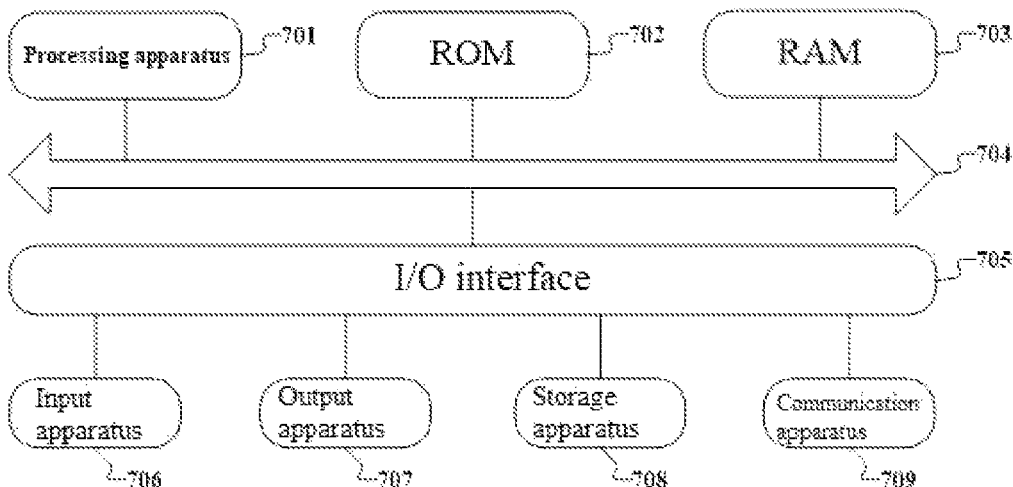
FIG. 7 is a structural schematic diagram of an electronic device suitable for implementing an embodiment of the present disclosure.

Referring now to FIG. 7, it shows a schematic structural diagram of an electronic device (for example, the terminal device in FIG. 1) 700 suitable for implementing the embodiments of the present disclosure. The terminal devices in the embodiments of the present disclosure may include, but are not limited to, mobile phones, notebook computers, digital broadcast receivers, PDAs (personal digital assistants), PADs (tablets), PMPs (portable multimedia players), vehicle-mounted terminals (For example, mobile terminals such as car navigation terminals) and fixed terminals such as digital TVs, desktop computers, etc. The terminal device shown in FIG. 7 is only an example, and should not bring any limitation to the function and scope of use of the embodiments of the present disclosure.

As shown in FIG. 7, the electronic device 700 may include a processing device (such as a central processing unit, a graphics processor, etc.) 701, which may be loaded into a random access device according to a program stored in a read-only memory (ROM) 702 or from a storage device 708. The program in the memory (RAM) 703 executes various appropriate actions and processing. In the RAM 703, various programs and data required for the operation of the electronic device 700 are also stored. The processing device 701, the ROM 702, and the RAM 703 are connected to each other through a bus 704. An input/output (I/O) interface 705 is also connected to the bus 704.

Generally, the following devices can be connected to the I/O interface 705: including input devices 706 such as touch screen, touch pad, keyboard, mouse, camera, microphone, accelerometer, gyroscope, etc.; including, for example, liquid crystal display (LCD), speakers, vibration. An output device 707 such as a device; a storage device 708 such as a magnetic tape, a hard disk, etc.; and a communication device 709. The communication device 709 may allow the electronic device 700 to perform wireless or wired communication with other devices to exchange data. Although FIG. 7 shows an electronic device 700 having various devices, it should be understood that it is not required to implement or have all of the illustrated devices. It may alternatively be implemented or provided with more or fewer devices. Each block shown in FIG. 7 may represent one device, or may represent multiple devices as needed.

In particular, according to an embodiment of the present disclosure, the process described above with reference to the flowchart can be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from the network through the communication device 709, or installed from the storage device 708, or installed from the ROM 702. When the computer program is executed by the processing device 701, the above-mentioned functions defined in the method of the embodiment of the present disclosure are executed.

It should be noted that the computer-readable medium described in the embodiments of the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, device, or device, or a combination of any of the above. More specific examples of computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the embodiments of the present disclosure, the computer-readable storage medium may be any tangible medium that contains or stores a program, and the program may be used by or in combination with an instruction execution system, apparatus, or device. In the embodiments of the present disclosure, a computer-readable signal medium may include a data signal propagated in a baseband or as a part of a carrier wave, and a computer-readable program code is carried therein. This propagated data signal can take many forms, including but not limited to electromagnetic signals, optical signals, or any suitable combination of the foregoing. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium can be transmitted by any suitable medium, including but not limited to: wire, optical cable, RF (Radio Frequency), etc., or any suitable combination of the above.

The above-mentioned computer-readable medium may be included in the above-mentioned terminal device; or it may exist alone without being assembled into the terminal device. The above-mentioned computer-readable medium carries one or more programs. When the above-mentioned one or more programs are executed by the electronic device, the electronic device: acquires an image of the target moving object, and the image presents the body parts of the target moving object; The image is input to a pre-trained detection model to obtain an output result indicating the position distribution of each limb part in the preset limb part set in the image; based on the output result, a heat map corresponding to each limb part is generated; The generated heat map is superimposed on the image at the location of the region corresponding to each limb part to generate an image after the superimposed heat map.

The computer program code used to perform the operations of the embodiments of the present disclosure can be written in one or more programming languages or a combination thereof. The programming languages include object-oriented programming languages—such as Java, Smalltalk, C++, and Conventional procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to Connect via the Internet).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more for realizing the specified logic function. Executable instructions. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations or it can be realized by a combination of dedicated hardware and computer instructions.

The units involved in the embodiments described in the present disclosure may be implemented in software or hardware. The described unit may also be provided in the processor. For example, it may be described as: a processor includes a processor including an acquisition unit, an input unit, a first generation unit, and a second generation unit. Wherein, the names of these units do not constitute a limitation on the unit itself under certain circumstances. For example, the acquisition unit can also be described as a "unit for acquiring an image of a target moving object".

The above description is only a preferred embodiment of the present disclosure and an explanation of the applied technical principles. Those skilled in the art should understand that the scope of the invention involved in the embodiments of the present disclosure is not limited to the technical solution formed by the specific combination of the above technical features, and should also cover the above-mentioned inventive concept without departing from the above-mentioned inventive concept. Other technical solutions formed by any combination of technical features or their equivalent features. For example, the above-mentioned features and the technical features disclosed in the embodiments of the present disclosure (but not limited to) having similar functions are replaced with each other to form a technical solution.

What is claimed is:

1. An image generation method, comprising:

acquiring an image of a target moving object, wherein one or more limb parts of the target moving object are presented in the image;

inputting the image to a pre-trained detection model to obtain an output result including a plurality of feature images for indicating position distribution of the one or more limb parts, presented in the image, in a preset limb part set, wherein the plurality of feature images includes a first feature image for a first limb part of the one or more limb parts, and a second feature image for a second limb part of the one or more limb parts, the first feature image and the second feature image having the same size as the image of the target moving object;

generating one or more thermodynamic images corresponding to the one or more limb parts based on the plurality of feature images of the output result; and superimposing the one or more thermodynamic images to one or more regional positions, corresponding to the one or more limb parts, in the image of the target moving object to generate a superimposed image comprising the image superimposed with the one or more thermodynamic images, wherein the first feature image includes a first limb contour for the first limb part of the one or more limb parts, and the second feature image includes a second limb contour for the second limb part of the one or more limb parts.

2. The method of claim 1, wherein the output result comprises a preset number of score matrices, each of the score matrices comprises scores which correspond to the image and are used for indicating pixel distribution of the limb parts presented in the image; and the score matrices are in one-to-one correspondence to the limb parts in the limb part set.

3. The method of claim 2, wherein the step of generating thermodynamic images corresponding to the one or more limb parts based on the output result comprises:

determining areas of pixels corresponding to scores greater than a preset threshold in each score matrix in the preset number of score matrices in the image; and generating thermodynamic images corresponding to the one or more limb parts based on the determined areas, the limb parts corresponding to the score matrices and preset color values of the thermodynamic images corresponding to the one or more limb parts.

4. The method of claim 2, wherein the detection model is obtained by training according to the following steps:

acquiring a training sample set, wherein the training sample set comprises sample images presenting the limb parts and indication information for indicating position distribution, in the sample images, of the one or more limb parts presented in the sample images; and performing training by using a machine learning method to obtain the detection model based on the training sample set in which the sample images are used as an input and the indication information corresponding to the sample images is used as a desired output.

5. The method of claim 4, wherein the indication information comprises score matrices which correspond to the sample images and are used for indicating pixel distribution of the limb parts presented in the sample images; and the step of performing training by using a machine learning method to obtain the detection model based on the training sample set in which the sample images are used as an input and the indication information corresponding to the sample images is used as a desired output comprises:

performing the following training steps: inputting the sample images in the training sample set to a convolutional neural network to obtain sample score matrices for indicating pixel distribution of the one or more limb parts in the sample images; determining whether differences of the obtained sample score matrices corresponding to the sample images and the score matrices in the indication information are smaller than a preset threshold; determining that the training for the convolutional neural network is completed in response to a determination that the differences are smaller than the preset threshold, and taking the trained convolutional neural network as the detection model; and adjusting parameters of a to-be-trained convolutional neural network in response to a determination that the differences are greater than or equal to the preset threshold, and re-performing the training steps.

6. The method of claim 1, wherein the detection model is obtained by training according to the following steps:

acquiring a training sample set, wherein the training sample set comprises sample images presenting the limb parts and indication information for indicating position distribution, in the sample images, of the one or more limb parts presented in the sample images; and performing training by using a machine learning method to obtain the detection model based on the training sample set in which the sample images are used as an input and the indication information corresponding to the sample images is used as a desired output.

7. The method of claim 6, wherein the indication information comprises score matrices which correspond to the sample images and are used for indicating pixel distribution of the limb parts presented in the sample images; and the step of performing training by using a machine learning method to obtain the detection model based on the training sample set in which the sample images are used as an input and the indication information corresponding to the sample images is used as a desired output comprises:

performing the following training steps: inputting the sample images in the training sample set to a convolutional neural network to obtain sample score matrices for indicating pixel distribution of the one or more limb parts in the sample images; determining whether differences of the obtained sample score matrices corresponding to the sample images and the score matrices in the indication information are smaller than a preset threshold; determining that the training for the convolutional neural network is completed in response to a determination that the differences are smaller than the preset threshold, and taking the trained convolutional neural network as the detection model; and adjusting parameters of a to-be-trained convolutional neural network in response to a determination that the differences are greater than or equal to the preset threshold, and re-performing the training steps.

8. The method of claim 1, wherein the generating one or more thermodynamic images further comprises highlighting the first limb contour with a first color in the first feature image, and highlighting the second limb contour with a second color in the second feature image, the first color being different from the second color.

9. An electronic device, comprising at least one processor; and a memory storing at least one program that upon execution by the at least one processor, causes the electronic device to:

acquire an image of a target moving object, wherein one or more limb parts of the target moving object are presented in the image;

input the image to a pre-trained detection model to obtain an output result including a plurality of feature images for indicating position distribution of the one or more limb parts, presented in the image, in a preset limb part set, wherein the plurality of feature images includes a first feature image for a first limb part of the one or more limb parts, and a second feature image for a second limb part of the one or more limb parts, the first feature image and the second feature image having the same size as the image of the target moving object;

generate one or more thermodynamic images corresponding to the one or more limb parts based on the plurality of feature images of the output result; and superimpose the one or more thermodynamic images to one or more regional positions, corresponding to the one or more limb parts, in the image of the target moving object to generate a superimposed image comprising the image superimposed with the one or more thermodynamic images, wherein the first feature image includes a first limb contour for the first limb part of the one or more limb parts, and the second feature image includes a second limb contour for the second limb part of the one or more limb parts.

10. The electronic device of claim 9, wherein the output result comprises a preset number of score matrices, each of the score matrices comprises scores which correspond to the image and are used for indicating pixel distribution of the limb parts presented in the image; and the score matrices are in one-to-one correspondence to the limb parts in the limb part set.

11. The electronic device of claim 10, wherein the step of generating thermodynamic images corresponding to the one or more limb parts based on the output result comprises:

determining areas of pixels corresponding to scores greater than a preset threshold in each score matrix in the preset number of score matrices in the image; and generating thermodynamic images corresponding to the one or more limb parts based on the determined areas, the limb parts corresponding to the score matrices and preset color values of the thermodynamic images corresponding to the one or more limb parts.

12. The electronic device of claim 10, wherein the detection model is obtained by training according to the following steps:

acquiring a training sample set, wherein the training sample set comprises sample images presenting the limb parts and indication information for indicating position distribution, in the sample images, of the one or more limb parts presented in the sample images; and performing training by using a machine learning method to obtain the detection model based on the training sample set in which the sample images are used as an input and the indication information corresponding to the sample images is used as a desired output.

13. The electronic device of claim 12, wherein the indication information comprises score matrices which correspond to the sample images and are used for indicating pixel distribution of the limb parts presented in the sample images; and the step of performing training by using a machine learning method to obtain the detection model based on the training sample set in which the sample images are used as an input and the indication information corresponding to the sample images is used as a desired output comprises:

performing the following training steps: inputting the sample images in the training sample set to a convolutional neural network to obtain sample score matrices for indicating pixel distribution of the one or more limb parts in the sample images; determining whether differences of the obtained sample score matrices corresponding to the sample images and the score matrices in the indication information are smaller than a preset threshold; determining that the training for the convolutional neural network is completed in response to a determination that the differences are smaller than the preset threshold, and taking the trained convolutional neural network as the detection model; and adjusting parameters of a to-be-trained convolutional neural network in response to a determination that the differences are greater than or equal to the preset threshold, and re-performing the training steps.

14. The electronic device of claim 9, wherein the detection model is obtained by training according to the following steps:

acquiring a training sample set, wherein the training sample set comprises sample images presenting the limb parts and indication information for indicating position distribution, in the sample images, of the one or more limb parts presented in the sample images; and performing training by using a machine learning method to obtain the detection model based on the training sample set in which the sample images are used as an input and the indication information corresponding to the sample images is used as a desired output.

15. The electronic device of claim 14, wherein the indication information comprises score matrices which correspond to the sample images and are used for indicating pixel distribution of the limb parts presented in the sample images; and the step of performing training by using a machine learning method to obtain the detection model based on the training sample set in which the sample images are used as an input and the indication information corresponding to the sample images is used as a desired output comprises:

performing the following training steps: inputting the sample images in the training sample set to a convolutional neural network to obtain sample score matrices for indicating pixel distribution of the one or more limb parts in the sample images; determining whether differences of the obtained sample score matrices corresponding to the sample images and the score matrices in the indication information are smaller than a preset threshold; determining that the training for the convolutional neural network is completed in response to a determination that the differences are smaller than the preset threshold, and taking the trained convolutional neural network as the detection model; and adjusting parameters of a to-be-trained convolutional neural network in response to a determination that the differences are greater than or equal to the preset threshold, and re-performing the training steps.

16. The electronic device of claim 9, wherein the generating one or more thermodynamic images further comprises highlighting the first limb contour with a first color in the first feature image, and highlighting the second limb contour with a second color in the second feature image, the first color being different from the second color.

17. A non-transitory computer-readable medium, storing a computer program to perform operations when the computer program is executed by a processor, the operations comprising:

acquiring an image of a target moving object, wherein one or more limb parts of the target moving object are presented in the image;

inputting the image to a pre-trained detection model to obtain an output result including a plurality of feature images for indicating position distribution of the one or more limb parts, presented in the image, in a preset limb part set, wherein the plurality of feature images includes a first feature image for a first limb part of the one or more limb parts, and a second feature image for a second limb part of the one or more limb parts, the first feature image and the second feature image having the same size as the image of the target moving object;

generating one or more thermodynamic images corresponding to the one or more limb parts based on the plurality of feature images of the output result; and superimposing the one or more thermodynamic images to one or more regional positions, corresponding to the one or more limb parts, in the image of the target moving object to generate a superimposed image comprising the image superimposed with the one or more thermodynamic images, wherein the first feature image includes a first limb contour for the first limb part of the one or more limb parts, and the second feature image includes a second limb contour for the second limb part of the one or more limb parts.

* * * * *